United States Patent [19]
Vandendolder et al.

[11] Patent Number: 6,006,419
[45] Date of Patent: Dec. 28, 1999

[54] SYNTHETIC RESIN TRANSREFLECTOR AND METHOD OF MAKING SAME

[75] Inventors: Ronald A. Vandendolder, Sunderland; Kenneth Wood, Hadley, both of Mass.

[73] Assignee: Millitech Corporation, South Deerfield, Mass.

[21] Appl. No.: 09/145,196

[22] Filed: Sep. 1, 1998

[51] Int. Cl.[6] .................................................... H01P 11/00
[52] U.S. Cl. ............................ 29/600; 156/245; 343/912
[58] Field of Search ...................... 29/600, 601; 156/245; 343/912

[56] References Cited

U.S. PATENT DOCUMENTS

| | | |
|---|---|---|
| 2,930,039 | 3/1960 | Ruze . |
| 3,049,464 | 8/1962 | Klima et al. . |
| 3,082,510 | 3/1963 | Kelly et al. . |
| 3,231,663 | 1/1966 | Schwartz . |
| 3,340,535 | 9/1967 | Damonte et al. . |
| 3,574,258 | 4/1971 | May et al. . |
| 3,897,294 | 7/1975 | MacTurk . |
| 4,001,836 | 1/1977 | Archer et al. . |
| 4,284,513 | 8/1981 | Dupressoir . |
| 4,387,377 | 6/1983 | Kandler . |
| 4,482,513 | 11/1984 | Auletti . |
| 4,652,886 | 3/1987 | Rosser et al. . |
| 4,937,425 | 6/1990 | Chang et al. . |
| 5,286,419 | 2/1994 | Van Ligten et al. . |
| 5,455,589 | 10/1995 | Huguenin et al. . |
| 5,458,820 | 10/1995 | Lefebre . |
| 5,512,371 | 4/1996 | Gupta et al. . |

*Primary Examiner*—Carl J. Arbes
*Attorney, Agent, or Firm*—Hamilton, Brook, Smith & Reynolds, P.C.

[57] ABSTRACT

A transreflector is made by forming a series of spaced parallel stripes of a conductive material on one surface of a synthetic resin carrier film. The film is placed against the surface of a mold defining the desired concave internal curve for the transreflector, and the mold cavity is closed by placing over the film in spaced relationship a second mold half having the desired convex external curve for the transreflector. A fluid synthetic resin is introduced into the mold cavity to form the desired transreflector element with spaced parallel stripes disposed on the internal concave surface thereof. The carrier film is removed from the transreflector element with the conductive material stripes remaining on the transreflector element.

11 Claims, 6 Drawing Sheets

SYNTHETIC RESIN TRANSREFLECTOR AND METHOD OF MAKING SAME

BACKGROUND OF THE INVENTION

The present invention relates to transflectors for use in radar and microwave antennas, and, more particularly, to a method of making precision transflectors from synthetic resin.

Transflectors are widely employed in antennas utilized in radar and microwave installations to serve as a reflector for waves of a particular polarization. Generally, such reflectors are concavo-convex structures having on the concave surface a grid of parallel fine wires disposed at closely spaced intervals which are dependent upon the frequency of the waves impinging thereon. The grid serves as a polarizer for the electromagnetic radiation and the convex surface functions as a focusing reflector for the component of radiation whose polarization is parallel to the wires.

May et al U.S. Pat. No. 3,574,258 granted Apr. 13, 1971 discloses such a transflector which is produced by securing a grating of wires to the surface of a synthetic resin sheet material which is then deformed to provide the desired concavo-convex configuration for the structure.

Ruze U.S. Pat. No. 2,930,039 granted Mar. 22, 1960 discloses a radiowave antenna in which finely divided wires are embedded in synthetic plastic bodies.

Damonte et al U.S. Pat. No. 3,340,535 granted Sep. 5, 1967 discloses an antenna in which wires are embedded between layers of synthetic resin.

Chang et al U.S. Pat. No. 4,937,425 granted Jun. 26, 1990 produces a transreflector by coating a substrate with an organometallic compound and then pyrolyzing the coating by high intensity focused light to produce the conductive grid.

Huguenin et al U.S. Pat. No. 5,455,589 granted Oct. 3, 1995 describes forming transflector by depositing a dielectric layer on a lens and then forming the metal grid on that dielectric layer.

The techniques heretofore employed attempted have involved tedious and difficult alignment of wires or deformation a closely spaced grid, or tedious techniques for removing metal to leave a grid of finely spaced conductors. Yet it is essential to the optimum operation of the transflector that the conductive stripes be parallel and uniformly spaced at small intervals. Precision alignment and spacing is difficult to obtain with such procedures and the cost of achieving a substantial degree of precision is quite high in such procedures.

It is an object of the present invention to provide a novel method for producing transreflectors which may be easily practiced to produce transreflectors with a high degree of precision for the reflective grid.

It is also an object to provide such a method for making transflectors which is relatively simple and economical.

Another object is to provide novel transreflectors in which a series of closely spaced fine lines of metal are firmly bonded to a synthetic resin body of the transflector.

SUMMARY OF THE INVENTION

It has now been found that the foregoing and related objects may be readily attained in a method for making a transreflector wherein a series of spaced parallel stripes of a conductive material are deposited upon a surface of a synthetic resin carrier film. This film is placed against the surface of a mold defining the desired concave internal curvature for the transreflector. A second mold half defining the desired convex external curve for the transreflector is placed over the film in spaced relationship, and the assembled halves provide a mold cavity. A fluid synthetic resin is introduced into the mold cavity to produce the desired transreflector element with spaced parallel stripes disposed on the internal concave surface thereof.

The synthetic resin carrier film is removed from the transreflector element while the conductive material stripes remain on the transreflector element. Each of the stripes comprises a multiplicity of closely spaced lines of the conductive material, and this is a metallic deposit.

Preferably, the resin of the carrier film is a polyester and the fluid synthetic resin is preferably selected from the low loss, low dielectric group consisting of polyesters, polymethyl pentenes, polybutylene terephtalate, polyethylene terephtalate, polyacrylates and styrene interpolymers. Desirably, the transreflector element is of generally circular peripheral configuration.

Generally the transreflector element is assembled with a retainer element which is preferably a ring engaged with the periphery of the transreflector element.

In one embodiment, the conductive material is deposited on the carrier film by physical vapor deposition of the metal. Alternatively, an ink having conductive particles therein may be printed onto the carrier film.

DETAILED DESCRIPTION OF THE PREFERRED EMBODIMENT

Figure 1:
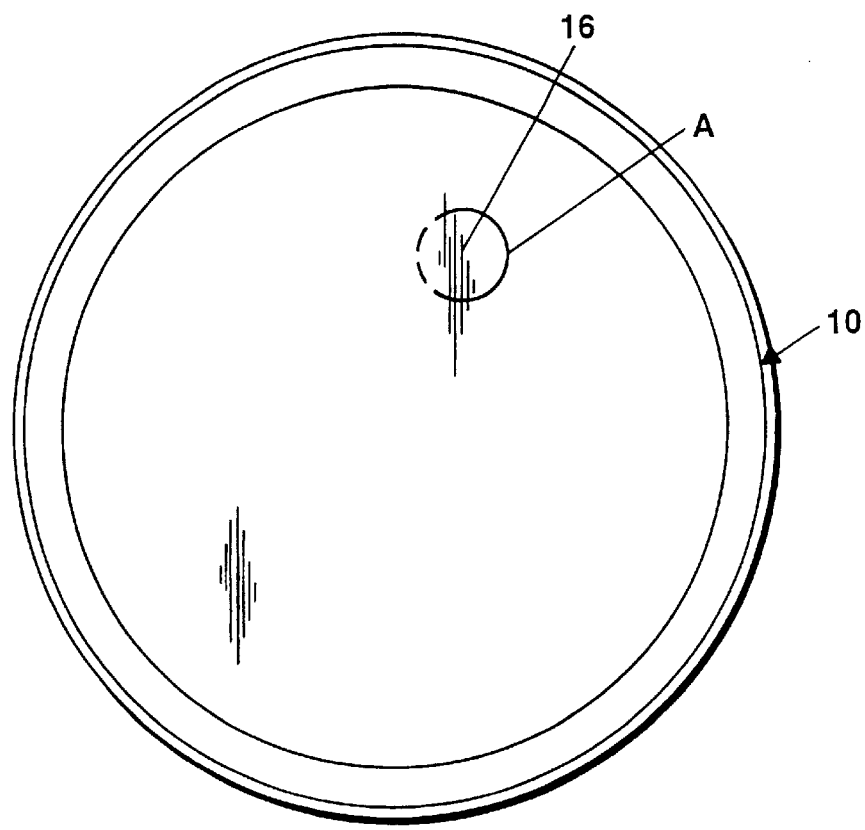
FIG. 1 is a bottom view of a transreflector element produced in accordance with the present invention.
Figure 5:
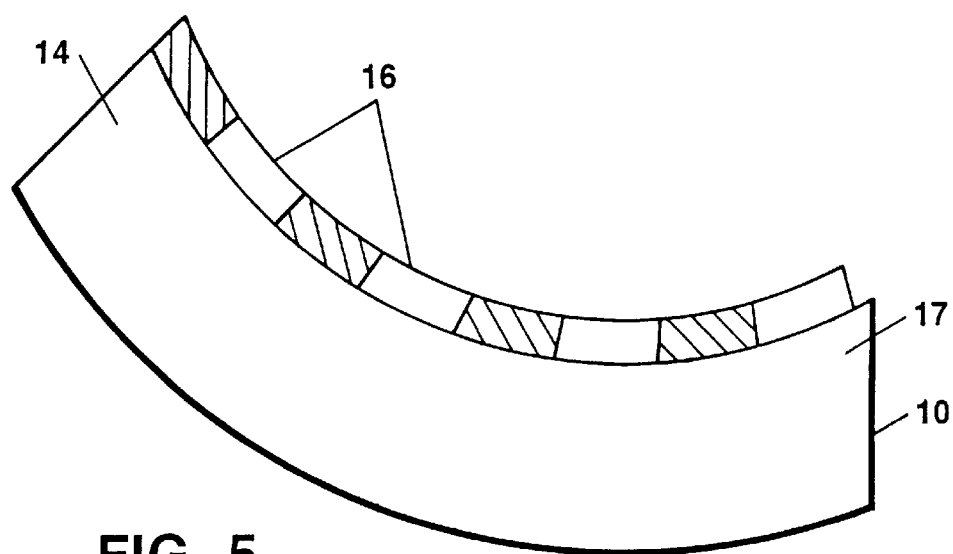
FIG. 5 is a greatly enlarged fragmentary section thereof.
Figure 2:
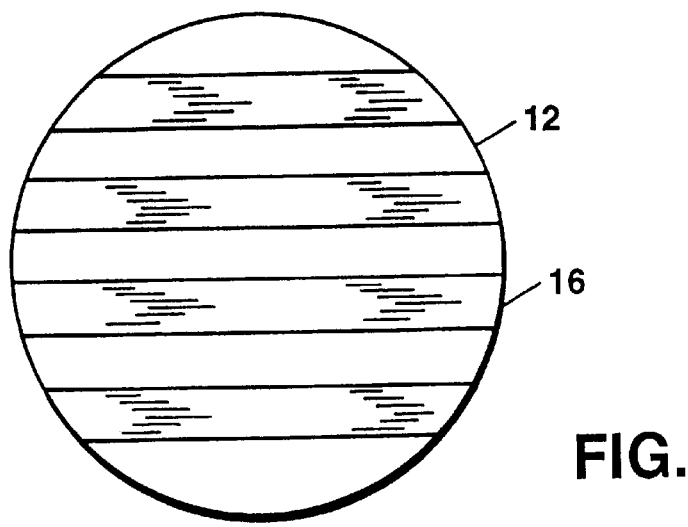
FIG. 2 is a greatly enlarged view of the surface portion designated A in FIG. 1.
Figure 3:
FIG. 3 is a side elevational view of the transreflector of FIG. 1.
Figure 4:
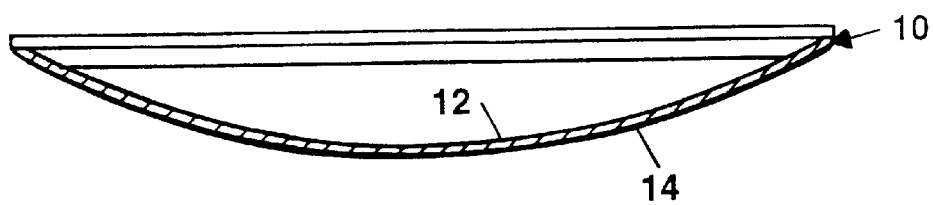
FIG. 4 is a sectional view thereof along the line 4—4 of FIG. 1.
Figure 6:
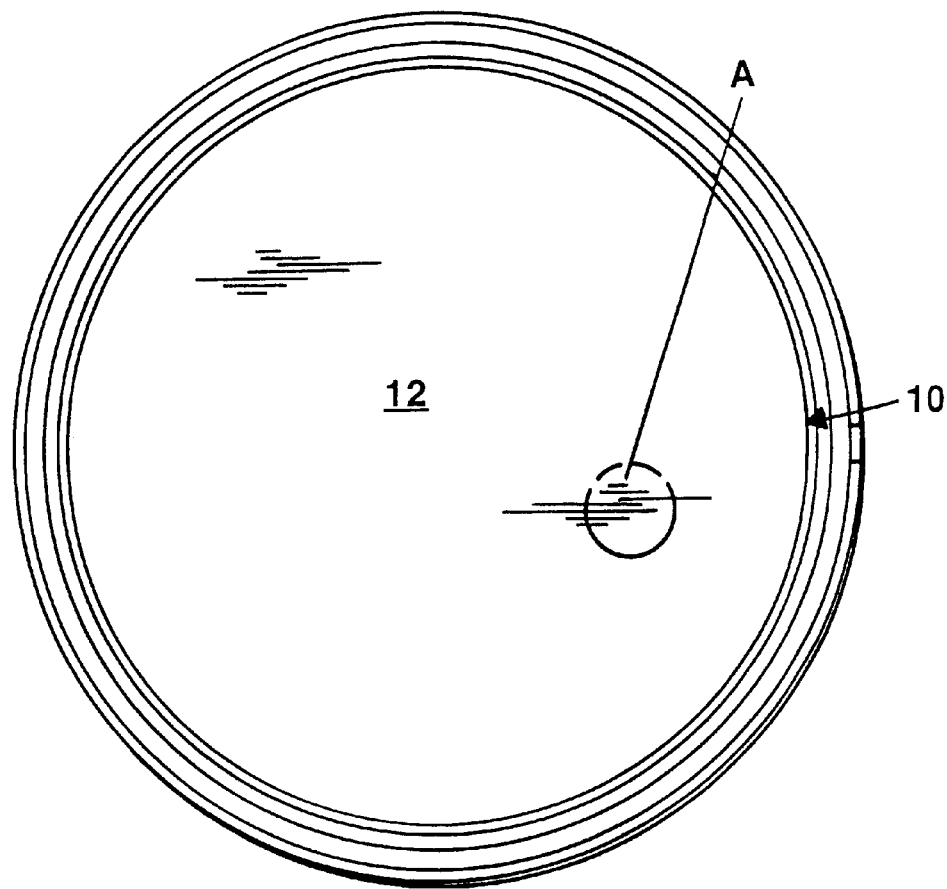
FIG. 6 is a plan view of the transreflector element assembled with a retaining ring.
Figure 7:
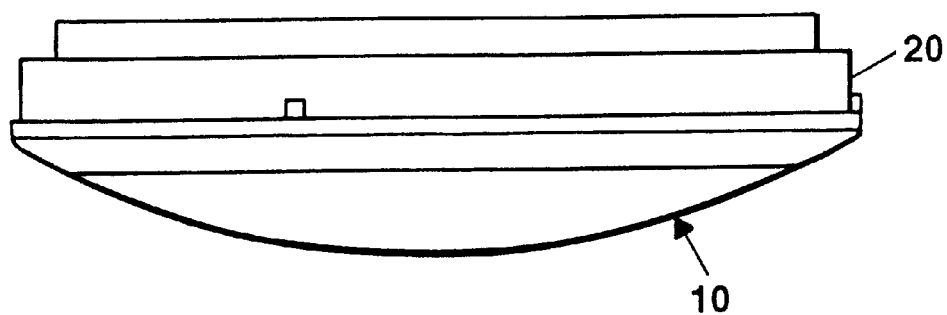
FIG. 7 is a side elevational view of the assembly of FIG. 6.
Figure 8:
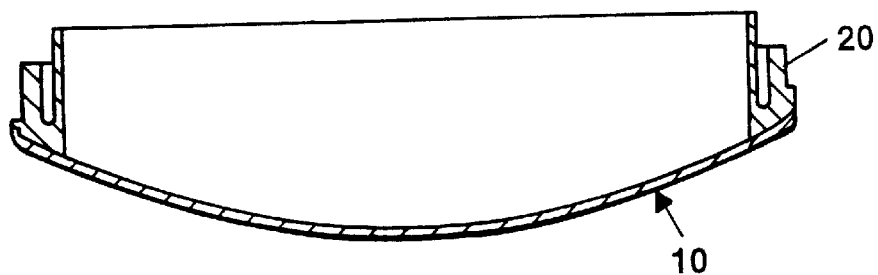
FIG. 8 is a sectional view thereof along the line 7—7 of FIG. 6.
Figure 9:
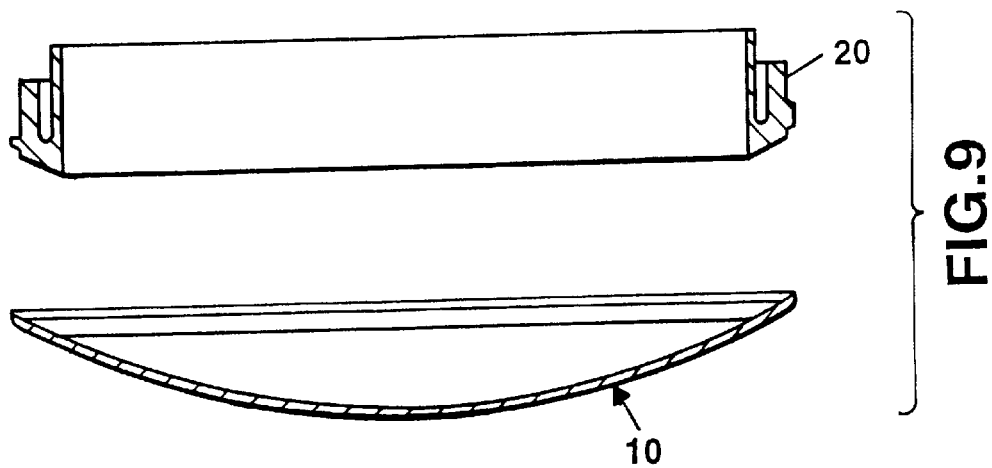
FIG. 9 is a sectional view of the retaining and transflector body prior to assembly.

Turning first to FIGS. 1–5, a transreflector element produced by the method of the present invention is generally designated by the numeral 10 and has a convex outer surface 14 and a concave inner surface 12 upon which there is a series of parallel spaced stripes 16 of conductive material. As seen in FIG. 2, the stripes 16 are in turn comprised of a series of parallel spaced lines 18.

As seen in FIGS. 6–9, a retaining ring 20 may be secured to the periphery of the transreflector 10 by ultrasonic or spin welding, or by adhesives, or by interfitting projections.

Figure 10:
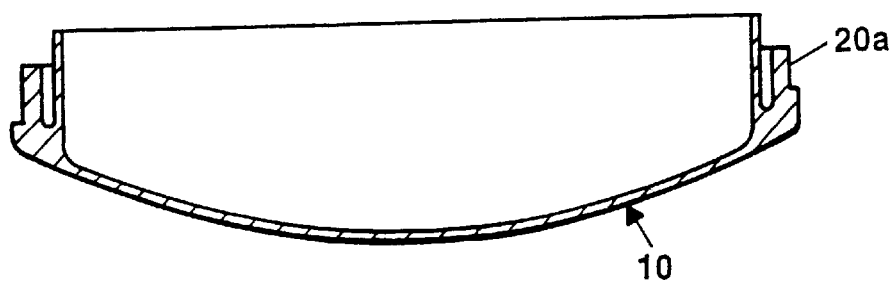
FIG. 10 is a similar sectional view of an integrally molded transreflector assembly.

As seen in the embodiment of FIG. 10, the retaining ring 20a may be integrally molded on the flange 21a about the transflector body 10a.

Figure 11:
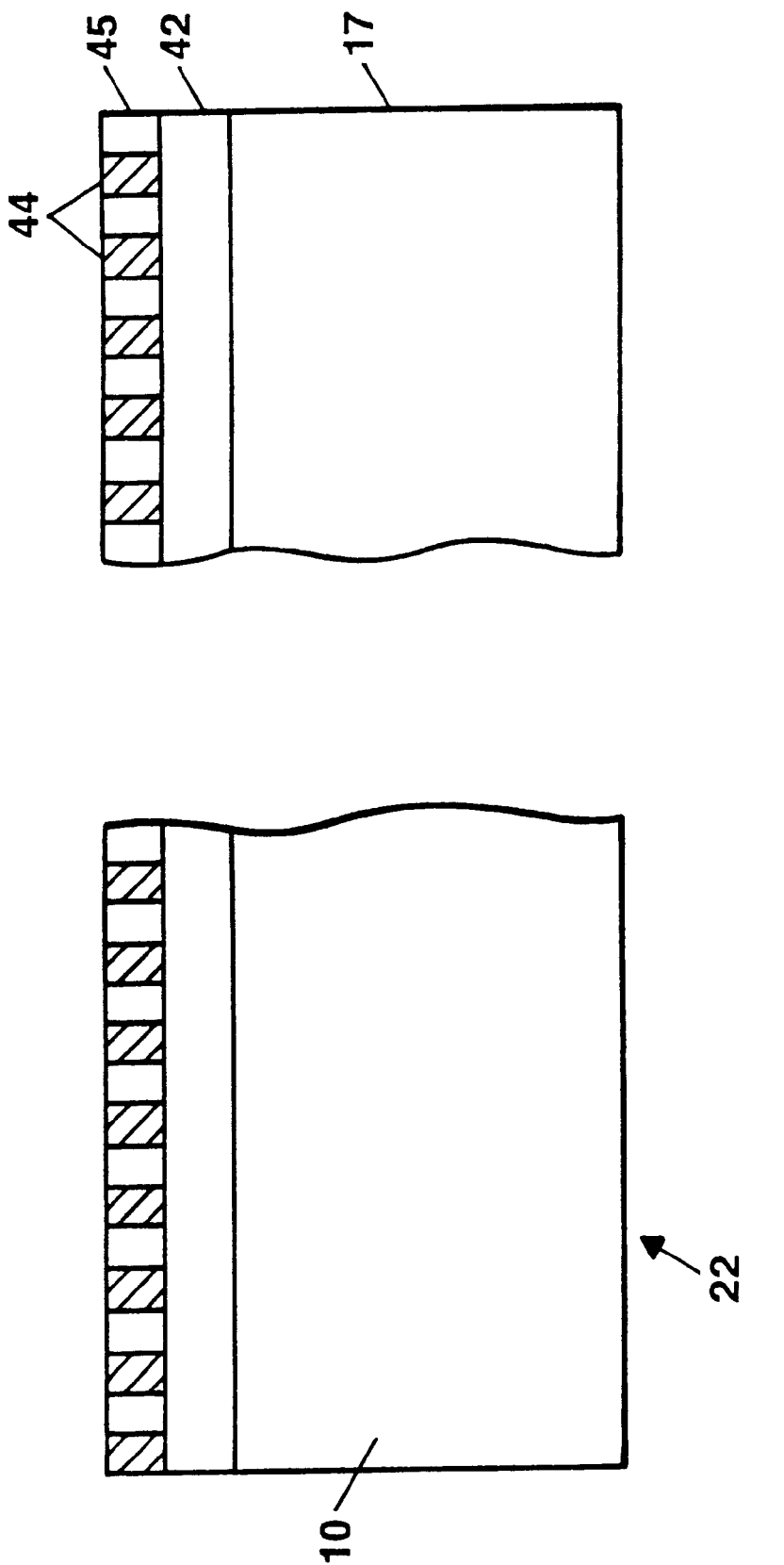
FIG. 11 is an enlarged fragmentary section of a transfer film utilized in the method of making the transreflector.

In accordance with the present invention, the transreflector 10 may be readily fabricated by first coating on a roll of carrier film 40 with a layer 42 of a release material and then a pattern 44 of conductive material a series of lines at spaced intervals to provide the transfer film 22. Over the pattern 44 is an adhesive coating 45. The transfer film 22 is illustrated in Figure 11.

Figure 12:
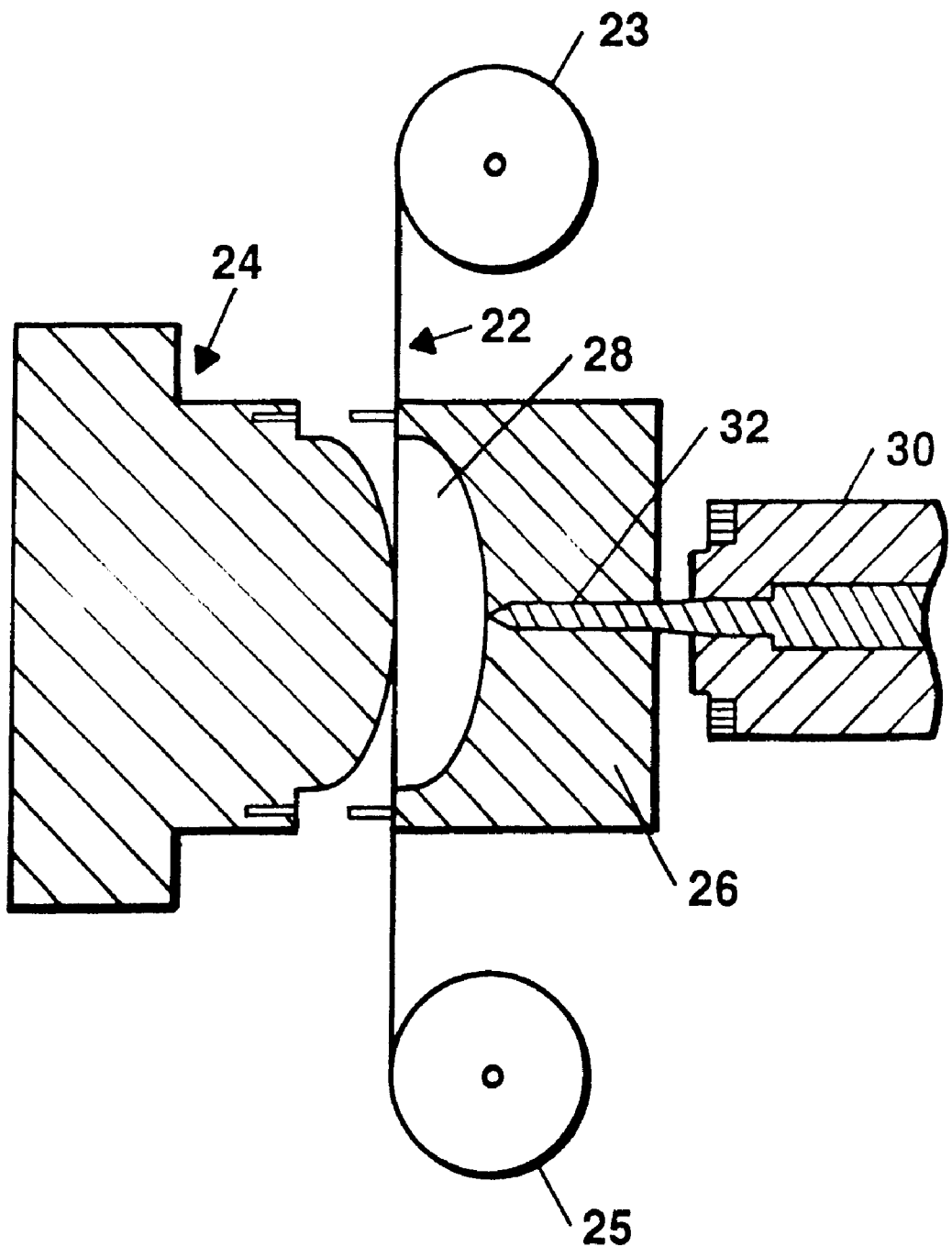
FIG. 12 is a diagrammatic illustration of the molding apparatus.

As seen in FIG. 12, the transfer film 22 is fed from the supply roll 23 to the takeup roll 25 between the mold halves 24, 26 and clamped therebetween against the convex surface of the mold half 24 with its conductive grid pattern 44 facing the mold cavity 28. Molten resin from the injection molding machine 30 is introduced into the mold cavity 28 and against the transfer film 22 through the nozzle 32.

Subsequently, the mold halves 24, 26 are opened, and the transreflector element removed therefrom with the pattern of conductive material now transferred to its inner concave surface, and the carrier film 40 is stripped therefrom.

If a retaining ring is desired and it has not been integrally formed with the body portion, a separate ring may be secured thereto in a secondary operation.

By use of the transfer film as the means for defining and providing the grid, the conductive metallic stripes can be formed with a high degree of precision through a printing process utilizing a conductive ink containing metallic particles or by vapor deposition of a metal through a mask. Precision procedures for doing so are well known in the industry and are readily adapted to forming the grid lines. The conductive stripes which are deposited on the layer of release material will readily transfer to the synthetic resin which is molded thereagainst. In some instances, the bond provided by the synthetic resin to the stripes will be sufficiently strong for purposes of the present invention. However, this bond is desirably enhanced by providing over the metal layer an adhesive layer compatible with the resin of the body. This layer is activated by the hot resin flowing thereagainst and produce a high bond between the resin of the body and the metallic stripes.

Registration of the patterns on the transfer film relative to the mold cavity can be readily effected automatically by providing formations such as perforated openings along the edges of the film or marks which can be readily detected by an electronic sensor.

The line widths and spacings can range from as little as 0.005 inch to greater than one inch with a tolerance of ±0.001 inch.

The preferred carrier film is polyethylene terephtalate having a thickness of 0.002–0.007 inch. However, other metallizable films which may be utilized are polycarbonate, polyvinyl chloride, polyimides and polyesters.

The thermoplastic resins for forming the body of the transreflector include polycarbonate, polymethyl methacrylate, ABS, polyethylene terephtalate and polybutylene terephtalate. High melt temperature engineering resins are not desirable for use in the present process.

The curvature of the transflector body can range from one-half to two inches in depth to obtain good registration and avoid deformation of the pattern of conductive lines on the transfer film. However, the diameter is limited only by the capacity of the injection molding machine which is used.

As can be seen from the foregoing detailed description and attached drawings, the method of the present invention is highly effective and provides a high degree of precision in the fine lines which are parallel and closely spaced. The transfer process allows transfer of the conductive lines to the synthetic resin body of the transreflector and good bonding as a part of the molding process. As a result, the transreflectors may be produced at relatively low cost and with a high degree of accuracy.

Having thus described the invention, what is claimed is:

1. In a method for making a transreflector, the steps comprising:

(a) depositing on one surface of a synthetic resin carrier film a series of spaced parallel stripes of a conductive material;

(b) placing said film on the surface of a mold defining the desired concave internal curve for the transreflector;

(c) assembling over said film in spaced relationship a second mold half having the desired convex external curve for the transreflector, said halves providing a mold cavity; and (d) introducing a fluid synthetic resin into said mold cavity to form the desired transreflector element with said spaced parallel stripes disposed on the internal concave surface thereof.

2. The method of making a transreflector in accordance with claim 1 including the step of removing said synthetic resin carrier film from said transreflector element, while said conductive material stripes remain on said transreflector element.

3. The method of making a transreflector in accordance with claim 1 wherein each of said stripes comprises a multiplicity of closely spaced lines of said conductive material.

4. The method of making a transreflector in accordance with claim 1 wherein said conductive material is a metallic deposit.

5. The method of making a transreflector in accordance with claim 1 where said resin of said carrier film is a polyester.

6. The method of making a transreflector in accordance with claim 5 wherein said fluid synthetic resin is a low loss, low dielectric constant polymer selected from the group consisting of polyesters, polymethyl pentenes, polyacrylates and styrene interpolymers.

7. The method of making a transreflector in accordance with claim 1 wherein said transreflector element is of generally circular peripheral configuration.

8. The method of making a transreflector in accordance with claim 1 including the step of assembling said transreflector element with a retaining element.

9. The method of making a transreflector in accordance with claim 8 wherein said retainer element is a ring engaged with the periphery of said transreflector element.

10. The method of making a transreflector in accordance with claim 1 wherein the step of depositing the conductive material on the carrier film comprises physical vapor deposition of a metal.

11. The method of making a transreflector in accordance with claim 1 wherein the step of depositing the conductive material on the carrier film comprises depositing an ink having conductive particles therein.

* * * * *